United States Patent [19]

Schnabel

[11] Patent Number: 5,007,149
[45] Date of Patent: Apr. 16, 1991

[54] METHOD FOR MANUFACTURING A SOLID ELECTROLYTE CAPACITOR IN A CHIP STRUCTURE

[75] Inventor: Werner Schnabel, Nattheim, Fed. Rep. of Germany

[73] Assignee: Siemens Aktiengesellschaft, Berlin and Munich, Fed. Rep. of Germany

[21] Appl. No.: 574,796

[22] Filed: Aug. 30, 1990

[30] Foreign Application Priority Data

Sep. 19, 1989 [DE] Fed. Rep. of Germany ....... 3931263

[51] Int. Cl.$^5$ ............................................... H01G 4/00
[52] U.S. Cl. ..................... 29/25.03; 361/540; 29/25.42
[58] Field of Search ............... 361/540, 532; 29/25.03; 439/516, 820, 890

[56] References Cited

U.S. PATENT DOCUMENTS

| | | | |
|---|---|---|---|
| 4,499,519 | 2/1985 | Fishman | 29/25.42 |
| 4,510,554 | 4/1985 | Irikura | 361/540 |
| 4,539,623 | 9/1985 | Irikura | 29/25.42 |
| 4,589,058 | 5/1986 | Peternell et al. | 29/25.03 |
| 4,882,115 | 11/1989 | Schmick | 29/25.03 |

*Primary Examiner*—Olik Chaudhuri
*Assistant Examiner*—Long Pham
*Attorney, Agent, or Firm*—Hill, Van Santen, Steadman & Simpson

[57] ABSTRACT

For mechanically stress-free assembly of a solid electrolyte capacitor, a system carrier whose cathode terminal and anode terminal are not parted before assembly is employed. The electrode terminals are parted from one another only after the welding of the anode wire to the anode terminal and soldering of the cathode contact to the cathode terminal, preferably being cut by a laser beam.

4 Claims, 1 Drawing Sheet

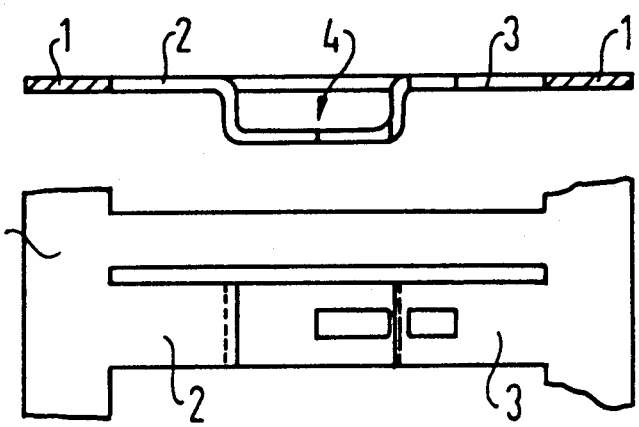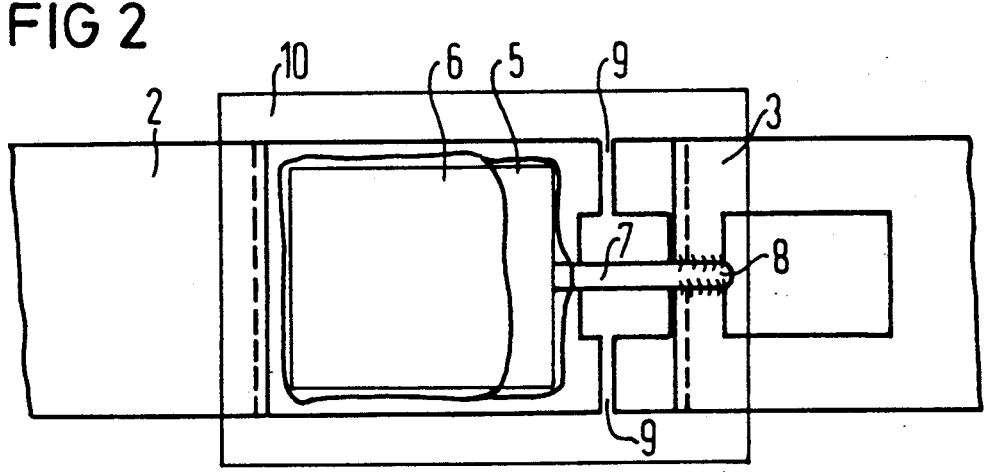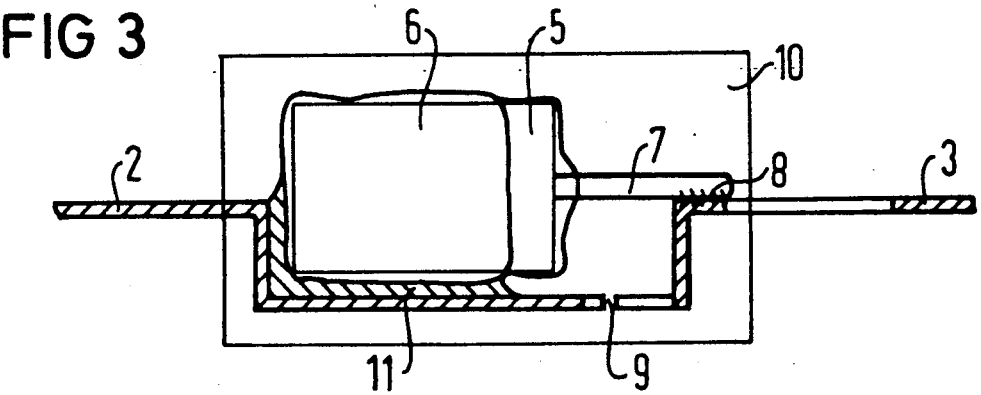

METHOD FOR MANUFACTURING A SOLID ELECTROLYTE CAPACITOR IN A CHIP STRUCTURE

BACKGROUND OF THE INVENTION

1. Field of the Invention:

The present invention relates to a method for manufacturing a solid electrolyte capacitor in a chip structure, whereby a sintered member composed of a valve metal (electrochemical vent or valve metal) is built into a system carrier having a cathode terminal and an anode terminal.

2. Description of the Prior Art

Such a method is disclosed, in general, in U.S. Pat. No. 4,483,062, fully incorporated herein by this reference. The system carrier employed therein has separate cathode and anode terminals.

In the manufacture of solid electrolyte capacitors in a chip structure, the integration of the capacitor element (completely coated anode) requires a carefully-matched assembly technology due to the smallness of the dimensions and the sensitivity of the capacitor element. Avoiding mechanical stresses is thereby a special problem. Such mechanical stress conditions can build up when welding and soldering the bridge-like structure between the anode terminal and the cathode terminal and the capacitor element. The junction between the sintered member and the anode wire is thereby the weakest point and, therefore, is particularly jeopardized. It is composed of the metallic contact produced by sintering between individual power drains composed of a valve metal (preferably tantalum) and the anode wire composed of the same material as the sintered member.

Both tensile forces and pressure forces, as well as rotational forces, can occur at this sensitive contact location between the sintered member and the wire. An increased residual current up to a short circuit of the capacitor is the consequence of such mechanical distortions. An increase in residual current can already be experimentally documented on the basis of an elastic distortion. This effect is reversible, i.e. the residual current returns to its original value after the stress is removed.

SUMMARY OF THE INVENTION

It is therefore an object of the invention to provide an assembly method for manufacturing solid electrolyte capacitors in a chip structure wherein the described, mechanical stressings are avoided.

The above object is achieved in that a system carrier having unparted cathode and anode terminals is employed, and in that the connection between the anode and the cathode is parted after the mounting of the sintered member in a system carrier.

The risk of a mechanical distortion is practically avoided on the basis of this design.

BRIEF DESCRIPTION OF THE DRAWING

Other objects, features and advantages of the invention, its organization, construction and operation will be best understood from the following detailed description, taken in conjunction with the accompanying drawing, on which:

FIG. 1 is a side view, shown in partial sections of a system carrier, and a plan view of that carrier;

FIG. 2 is a plan view of the system carrier having an capacitor element assembled in the carrier; and FIG. 3 is a side view, again partially shown in section, of a system carrier having a capacitor element assembled therein.

DESCRIPTION OF THE PREFERRED EMBODIMENTS

FIG. 1 illustrates a system carrier that is composed of a continuous carrier band 1 that is provided with a cathode terminal 2 and an anode terminal 3. The system carrier 1 is shaped such that an "integration nest" 4 that is preshaped corresponding to the size of the capacitor element is present in the region in which the capacitor element is to be later assembled. In that the cathode terminal 2 and the anode terminal 3 are rigidly connected to one another in the region of the integration nest 4, relative motions between these terminals with the mechanical stresses in the capacitor element connected therewith are not possible.

FIGS. 2 and 3 illustrate a plan view and a side view of the integrated sintered member 5. The sintered member 5 composed of a valve metal, for example tantalum, is provided with an oxide carrier serving as a dielectric and has a solid electrolyte, for example semiconducting manganese dioxide, as a cathode. A conductive layer 6, for example a conductive silver lacquer layer, that connects the sintered member 5 to the cathode terminal 2 with a solder 11 serves the purpose of cathode contacting. The anode wire 7 composed of the same material as the sintered member 5 (preferably tantalum) is connected to the anode terminal 3 at a weld 8. After producing the connections between the sintered member 5 and the electrode terminals, the system carrier is parted to the location 9, for example with the assistance of the laser, as a result whereof the cathode terminal 2 and the anode terminal 3 are parted from one another.

A manufacture of the sintered anode member 5 up to the manufacture of the cathode contact layer 6 occurs, for example in conformity with the method disclosed in the German application No. 27 40 745 C2. The anode member is thereby secured to holding mechanisms and is further processed. Since the exact spacing of the anodes at the holding mechanism is no prerequisite of the assembly method, the smallest possible spacing can be selected and lamina-shaped anodes can be transversely welded instead of being longitudinally welded. As a result of the described measures, an increase in piece numbers per frame of more than 50% can be achieved in comparison to previous manufacturing methods.

It is advantageous to tin-plate the anode member 5 before being mounted in the carrier band 1. During assembly, this measure has the advantages that the anodes have a better mechanical protection against damage, that a better automatic manipulability in a pick-and-place process exists, and that, finally, a better moistening in a reflow soldering process is guaranteed even after a longer intermediate storage. A higher manufacturing reliability therefore results, this being a prerequisite for high yield and a uniformly-high quality and reliability standard of the components.

The tin plating of anodes can be integrated into the automatic fabrication sequence and occurs in the following manner in that, first of all, the anodes are coated with a solder paste, are subjected to a reflow soldering (IR, hot air or vapor phase process), and that, subsequently, the anodes are separated from the holding mechanism (for example, with a laser, this producing no mechanical stressing of the anodes and, moreover, allowing the utilization of thinner anode wires) and are placed in magazines in an ordered fashion. Instead of being placed in magazines, the later, ordered offering is also possible via a shaker system.

The method steps can be preferably carried out with the assistance of a robot that processes individual holding mechanisms in succession:

removal of a holding mechanism with anodes from the retaining frame;

coating the anodes with solder paste;

reflow soldering of the paste with the vapor phase process, whereby the excess fluxing agent drips off, so that no additional cleaning is required; and cutting off and placing the anodes in magazines.

In the assembly process, the sintered member 5 is brought into the intended position, the anode wire 7 is welded on and the sintered member 5 is soldered or glued with conductive glue. The standard technologies are realized for the work processes of positioning, welding, soldering or gluing. Following the assembly of the capacitor element 5, the connection between the anode terminal 3 and the cathode terminal 2 of the system carrier 1 is then parted, this being capable of being carried out, for example, with the assistance of a laser. The remaining manufacturing steps such as enveloping, parting, bending the terminals 2, 3, final shaping, testing, etc., occur in the usual manner.

In summary, the following, critical features of the assembly method can be emphasized:

higher dimensional accuracy;

mechanically stress-free assembly and, therefore, higher yields;

miniaturizability; and possibility of shorter anode wire lengths.

An additional advantage is comprised in that a capacitor having a particularly low inductivity results due to the specific design of the system carrier 1. This occurs because the region between the anode terminal 3 and the cathode terminal 2 that determines the inductivity is kept especially small.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method of manufacturing a solid electrolyte capacitor including a capacitor chip and a carrier band, the chip comprising a cathode plate and an anode wire and the carrier band comprising an anode section as an anode terminal, a cathode section as a cathode terminal and an intermediate recess section connected between the anode and cathode sections, comprising the steps of:
   (a) placing the capacitor chip in the recess section, and
      (a1) electrically connecting the cathode plate to the cathode section;
   (b) electrically connecting the anode wire to the anode section; and
   (c) separating the anode section from the cathode section by cutting the carrier band between the anode section and the cathode section.

2. The method of claim 1, wherein the step (c1) of cutting is further defined as
   (c1a) laser cutting the carrier band to separate the anode section from the cathode section.

3. The method of claim 1, wherein the step (a1) of electrically connecting the cathode plate to the cathode section is further defined as:
   (a1a) soldering the cathode plate to the cathode section.

4. The method of claim 1, wherein the step (b) of electrically connecting the anode wire to the anode section is further defined as:
   (b1) welding the anode wire to the anode section.

* * * * *